United States Patent [19]

Gibtner et al.

[11] Patent Number: 5,421,304
[45] Date of Patent: Jun. 6, 1995

[54] INTERNAL COMBUSTION ENGINE KNOCK CONTROL SYSTEM APPARATUS AND METHOD

[75] Inventors: Siegfried Gibtner, Gaimersheim; Bernhard Pfalzgraf, Ingolstadt, both of Germany

[73] Assignee: Audi AG, Ingolstadt, Germany

[21] Appl. No.: 329,043

[22] PCT Filed: Mar. 18, 1992

[86] PCT No.: PCT/EP92/00583
§ 371 Date: Nov. 19, 1992
§ 102(e) Date: Nov. 19, 1992

[87] PCT Pub. No.: WO92/16740
PCT Pub. Date: Oct. 1, 1992

Related U.S. Application Data

[63] Continuation of Ser. No. 952,627, Nov. 19, 1992, abandoned.

[30] Foreign Application Priority Data

Mar. 22, 1991 [DE] Germany .................. 41 09 432.8

[51] Int. Cl.⁶ ................................ F02P 5/14
[52] U.S. Cl. ..................................... 123/425
[58] Field of Search ............... 123/425, 435, 406, 421; 364/431.08, 557

[56] References Cited

U.S. PATENT DOCUMENTS

| | | | |
|---|---|---|---|
| 4,829,962 | 5/1989 | Haefner et al. | 123/425 |
| 5,076,235 | 12/1991 | Nagel et al. | 123/425 |
| 5,276,625 | 1/1994 | Nakaniwa | 364/431.08 |
| 5,284,116 | 2/1994 | Richeson, Jr. | 123/425 |
| 5,287,836 | 2/1994 | Shimasaki et al. | 123/406 |
| 5,287,837 | 2/1994 | Hashimoto et al. | 123/425 |
| 5,303,168 | 4/1994 | Cullen et al. | 364/557 |
| 5,305,722 | 4/1994 | Fukui | 123/425 |
| 5,327,868 | 7/1994 | Witkowski et al. | 123/421 |
| 5,355,853 | 10/1994 | Yamada et al. | 123/425 |

FOREIGN PATENT DOCUMENTS

| | | | |
|---|---|---|---|
| 0101342 | 2/1984 | European Pat. Off. | F02P 5/04 |
| 0326193 | 8/1989 | European Pat. Off. | F02P 5/15 |
| 2511435 | 2/1983 | France | F02P 5/14 |
| 2740044 | 3/1979 | Germany | F02P 5/14 |
| 3027532 | 2/1982 | Germany | F02P 5/14 |
| 3116593 | 11/1982 | Germany | F02P 17/00 |
| 3313036 | 10/1984 | Germany | F02P 5/14 |
| 3419727 | 11/1985 | Germany | F02P 5/14 |
| 3526895 | 2/1986 | Germany | F02D 41/26 |
| 3545808 | 7/1986 | Germany | F02P 5/15 |
| 3545810 | 7/1986 | Germany | F02P 5/15 |
| 3546166 | 7/1986 | Germany | F02P 5/15 |
| 8912746 | 12/1989 | Germany | F02P 5/15 |
| 9110829 | 7/1991 | Germany . | |
| 4008170 | 9/1991 | Germany | F02P 5/15 |
| 9114097 | 9/1991 | Germany | F02P 5/15 |
| 2205608 | 12/1988 | United Kingdom | F02P 5/145 |
| 2231917 | 11/1990 | United Kingdom | F02P 5/145 |
| 2231920 | 11/1990 | United Kingdom | F02P 5/145 |

*Primary Examiner*—Raymond A. Nelli
*Attorney, Agent, or Firm*—Jacques M. Dulin

[57] ABSTRACT

A knock control system and method for operation of a spark ignition internal combustion engine having short-term regulation with a relatively large regulating action, such that when knocking events occur, the value for an actual ignition point is reset in the retard direction from a predetermined characteristic diagram value. In the absence of knocking events, the actual ignition point is advanced to the predetermined characteristic diagram value. Long-term adaptation is carried out such that the predetermined characteristic diagram value is reset from the knock limit by an adaptation value when knocking events occur during a change between a first operating condition to a second operating condition so that the short-term regulation is referred to a new predetermined ignition point value associated with the second operating condition. There is a switch-over to a smaller regulating action after an adaptation has been effected and after a minimum number of knockless ignitions have been desired. A more advanced ignition angle and improved efficiency of the internal combustion engine are achieved.

18 Claims, 2 Drawing Sheets

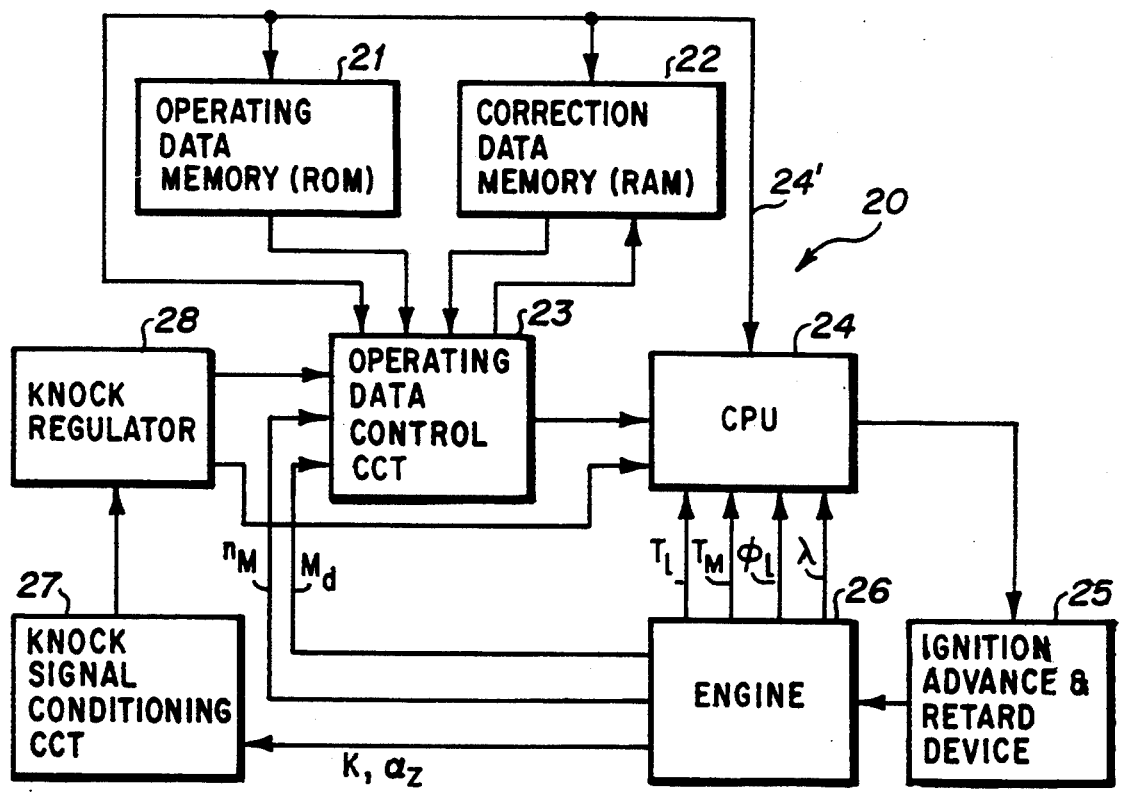
Fig_1 KNOWN SYSTEM
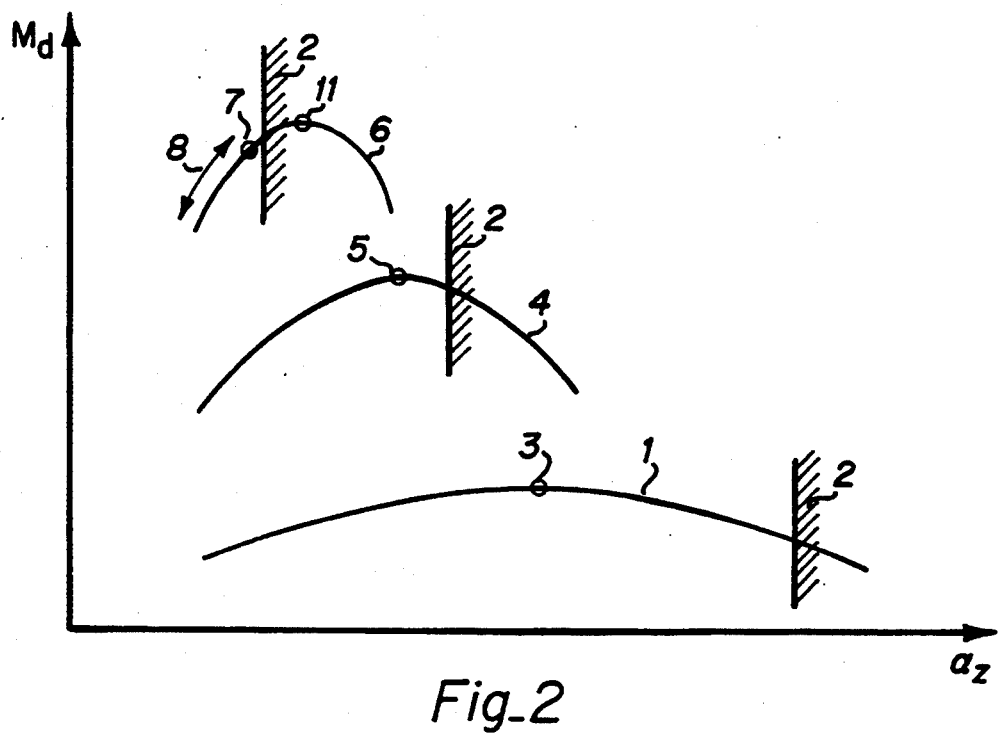
Fig_2

INTERNAL COMBUSTION ENGINE KNOCK CONTROL SYSTEM APPARATUS AND METHOD

CROSS REFERENCE TO RELATED APPLICATIONS

This Application is a continuation of U.S. Ser. No. 07/952,627 filed Nov. 19, 1992, now abandoned the same inventors, which in turn is based on PCT/EP92/00583 filed Mar. 18, 1992 and German application P4109432.8 filed Mar. 22, 1991 for the same invention.

FIELD

The present invention relates to ignition control for an internal combustion engine, and more specifically to a knock control system and method for a spark ignition internal combustion engine.

BACKGROUND

In order to achieve optimized operation in a spark ignition internal combustion engine, it is necessary to vary the ignition timing or ignition point in accordance with the engine speed and load. For this purpose it is known practice to enter predetermined characteristic diagram values (sometimes referred to as characteristic map input) in a characteristic diagram (or characteristic map) of an electronic engine timing device in accordance with the load and speed such that the characteristic diagram values can be read out for each actual ignition point.

It is also known in the art to operate the internal combustion engine in the higher load range close beneath the knock limit in order to optimize fuel efficiency and low pollutant emission levels. However, care must be taken to ensure that the knock limit is not exceeded, since the risk of damage to the engine is great if the knock limit is exceeded too frequently. Since knock primarily occurs under wide-open-throttle operating conditions, it is therefore a direct constraint on engine performance. Further, since the position of the knock limit varies depending upon existing engine operating parameters, in particular fuel grade, temperature and air pressure, it is the known practice to control or regulate knocking on a short-term basis.

In accordance with the short-term knock control practice described above, when knocking combustion or knocking events occur, the predetermined characteristic diagram value taken from the characteristic diagram is reset one step at a time by a control stroke in the direction of retarded ignition through a relatively large retard correction value to a second adjusted diagram value for the actual ignition point. In the subsequent absence of any further pinging or knocking events, the retarded value for the actual ignition point is advanced, one control stroke at a time back to the original predetermined characteristic diagram value.

This short-term control or regulation is therefore related to the level of the predetermined characteristic diagram value entered in the characteristic diagram of the timing device for a particular engine. When the operating parameters are unfavorable, in particular when the fuel quality is poor, the knock limit may be relatively remote from the predetermined characteristic diagram value or map input. In this case, the knock control must be carried out with stepwise control strokes of an appropriate size and within a wide control band width. This has a disadvantageous effect on the control stability, since a relatively high number of knocking combustions, with sometimes violent and audible detonations, must be tolerated during the knock control period. This has an adverse effect on passenger comfort since knock produces unpleasant noise due to the sometimes audible detonations. In addition, such a protracted series of knocking combustions adversely affects the engine and the operation of the motor vehicle.

In the known practice, the short-term knock control starts with certain control strokes upon reaching an operating point of a particular speed and load. Upon leaving this operating point and reaching another operating point, the predetermined characteristic diagram value obtained from the characteristic diagram usually also changes in correspondence with the new operating point. The short-term control must then also re-adapt to these new conditions. When the transition conditions are unfavorable, a reactively high number of knocking combustions with sometimes violent detonations must be tolerated until the short-term control has re-adapted to the new operating point in the best possible manner.

Another problem with short-term knock control is that the first retard correction value has a fixed magnitude and cannot be automatically altered to account for changing operational conditions. For example, in order to stabilize out of knocking events as quickly and reliably as possible, a relatively large regulating action with a relatively large retard correction value is desirable. However, this is disadvantageous in that after subsequent knocking events, this technique causes the internal combustion engine to operate well below the knock limit in an inferior operating range since a large retard adjustment of the ignition angle has been made. It is therefore highly desirable to be able to reduce the magnitude of the correction value once such a large magnitude correction is no longer required.

It is also known practice to enter a plurality of set characteristic diagrams and make them available as required. For example, a connector may be installed in the engine compartment to switch from a specific characteristic diagram allocated to running on supergrade fuel to a second preset characteristic diagram for use when running on regular fuel. Alternatively, a characteristic diagram switch-over may be carried out automatically if a high number of knocking events is experienced. This automatic switch-over may be carried out by a learning function associated with a microprocessor or computer control means of the knock control system. Examples of such learning systems are disclosed in U.S. Pat. No. 4,829,962 and published international patent application No. PCT/EP88/00523, now U.S. Pat. No. 5,076,235, the subject matter of which are incorporated by reference as background for components of knock control systems of the type described herein. However these switch-overs represent an overall change or resetting of the ignition point for the entire engine characteristic diagram. Also, as with the case above, a number of knocking combustions must be tolerated during the switch-over period and the knock control range or band width is wide when transitions are made thus giving an unfavorable effect on the control stability.

Accordingly, there is a definite need in the art for an improved knock regulation system and method which overcomes the problems and shortcomings of the prior art.

THE INVENTION

Objects

It is a primary object of the present invention to provide a knock control method having short-term knock control for operation of the engine close beneath the knock limit for optimized engine performance and having long-term adaption to quickly and reliably stabilize out of knocking events once the knock limit is exceeded during a change from a first operating condition to a second operating condition.

It is another object of the present invention to reduce the incidence of knocking combustions and to keep knock control more stable overall during the knock control period.

These and other objects of the present invention will become apparent to those skilled in the art from the following detailed description of the preferred embodiment, drawings and appended claims.

DRAWING

FIG. 1 is a basic block diagram of known internal combustion engine control systems of the type having microprocessor ignition control to which the present invention is applied;

FIG. 2 is a characteristic diagram of load Md versus ignition angle $\alpha_z$ which illustrates the position of the knock limit for various engine load ranges; and FIG. 3 is a diagram illustrating the adaptation of a reference level $a_v$ for the ignition angle $\alpha_z$ to a second reference level $\alpha L_z$ for short-term knock regulation through long-term adaptation and wherein the operation with a large and a small regulating action is plotted.

SUMMARY

The present invention concerns a system and method for knock control in a spark ignition internal combustion engine comprising both long-term adaptation and short-term regulation techniques. The long-term adaptation is carried out such that a predetermined characteristic diagram value entered in a characteristic diagram of an electronic timing device is adjusted away from the knock limit in the retard direction by an adaptation value when knocking events occur, such that the short-term regulation is referred to a new ignition point input value (predetermined characteristic diagram value plus adaptation value) or to a different level. The adaptation values are determined in accordance with the occurrence of knocking events within certain repetitive observation periods or monitoring intervals.

In this way, the reference level for control is redetermined within the repetitive observation periods and in accordance with the knocking events occurring therein. During this time, the control range control band width and hence the knock limit are maintained only a small distance from this reference level. The position of this reference level is varied by adding suitable, determined correction values to the values from the entered characteristic diagram. This continuous repositioning of the reference level for the short-term control, together with the reduction in the control range, results in a reduction in the knocking combustions and in violent detonations, thus improving comfort in terms of noise and reducing the load on the internal combustion engine. In addition, the overall knock control becomes more reliable and stable and thus easier to control.

In addition to varying the knock control reference level, the magnitude of the regulating or controlling action is appropriately adjusted such that decreased magnitude retard and advance correction values are used in place of the larger magnitude correction values associated with the knock control action of the previous operating point or condition. This switch-over to smaller correction values is carried out when it can be safely assumed that a substantial regulating action is unnecessary, i.e. where the risk of engine knock occurring is generally not high and the internal combustion engine is being operated in a lower load range where the risk of engine knock occurring is small. Favorable conditions of this kind exist and are detected according to the invention if a learned adaptation value for the long-term adaptation is already present (for the respective operating point) and a minimum number of knockless ignitions, one after the other, has been ascertained. In this way, it may then be assumed that a subsequently occurring detonation is more likely to be a random event such that a general and fast displacement regulation with a large retard adjustment and a large retard correction value is unnecessary.

An observation period for determining the adaptation values or an evaluable dwell time at an operating point preferably amounts to at least 500 ignitions. Owing to this type of switch-over to a smaller regulating action with smaller correction values, a more advanced ignition angle may be maintained thus resulting in an overall improvement in the efficiency of the internal combustion engine, since it may be consistently operated closer to the knock limit.

In accordance with a preferred embodiment of the invention, the predetermined characteristic diagram values associated with a number of adjacent engine operating points or conditions in the characteristic diagram, corresponding to various speed and load ranges are combined in a manner which is known per se. For example, each cylinder of the internal combustion engine may be allocated its own characteristic diagram with a desired set of adaptation values for operation in a cylinder-selective manner. Thus, each of the cylinders may be operated separately in a thermodynamically optimum manner, thereby making it possible to keep fuel consumption and pollutant emissions to a minimum. In this way, it is convenient to enter adaptation values in correction characteristic diagram areas associated with the characteristic diagram areas. These characteristic diagrams may, for example, be formed as an 8×8 matrix with 8 defined speed points and 8 defined load points.

The long-term adaptation is carried out such that an adaptation value corresponding to the distance of the actual ignition point from the predetermined characteristic diagram value is determined for a particular operating condition or corresponding to a particular speed and load. This adaptation value is entered in a correction characteristic diagram upon leaving the operating point and is output as a "learned" correction magnitude when this operating point is reached or exceeded again. Known learning algorithms may be used for this purpose. The predetermined characteristic diagram value is then acted upon by this information for the anticipatory control of the short-term regulation.

The knock control thus comprises a kind of automatic learning process wherein, in addition to the predetermined characteristic diagram values which are entered at the outset, adaptation values which depend from certain operating parameters are determined and stored during transition to each new operating condition (point). An adaptation value of this kind may, for example, be the value for retarding the ignition point if the vehicle had just been filed with fuel of an inferior quality. In this case the adaptation value is determined on the basis of the short-term control such that it corresponds to the distance of the knock limit from the predetermined characteristic diagram value, i.e., the adaption value corresponds approximately to the distance of the actual ignition point away from the predetermined characteristic diagram value. If after leaving this operating point it is soon reached again, the long-term conditions, such as the fuel quality in the fuel tank, will not usually have undergone an abrupt and fundamental change. Thus, when the operating point is reached again, the predetermined characteristic diagram value is acted upon by the stored adaption value, so that the regulation is controlled in an anticipatory manner and is started in the vicinity of the knock limit. In the absence of the anticipatory control, each time a new operating point is reached the regulation would usually start in a knocking range corresponding to the predetermined characteristic diagram value, thus resulting in an undesirable number of violent detonations when stabilizing out of this range.

In one embodiment of the invention, an actual control stroke, preferably the last control stroke before the respective operating point is left, is detected and stored as the adaptation value.

To provide better information on the position of the knock limit a more favorable adaptation value may be obtained by averaging the control strokes. This averaging step is preferably carried out within a certain observation time period, such as, for example, the dwell time at the ignition point. In another embodiment, the control strokes present when a knocking event occurs are used for the averaging step. The averaging step may be carried out over all control strokes within an observation period or during the dwell time at a certain ignition point. Both forms of averaging produce suitable, utilizable information regarding the position of the knock limit and thus a suitable adaptation value.

As is well understood in the art, the knock limit is not a precisely defined limit, but is rather seen as a statistical limit, such that it is possible for knocking events to occur above or below the determined statistical knock limit, depending upon the quality of the combustion at the time. Therefore, since the position of the knock limit does not in any case represent a precisely defined magnitude, it has been found desirable to enter an adaptation value in the correction diagram or replace an old adaptation value by a new one only if the value of the change in the averaged control strokes lies above the value of an established threshold. As the averaging of the control strokes only produces utilizable results within a certain dwell time, it has also been found advantageous to store adaptation values only when the number of ignitions does not fall below a certain value.

The measures so far described enable the short-term control through the adaptation values to be moved from the entered predetermined characteristic diagram value in the direction of retarded ignition. If the knock limit gradually moves towards the original predetermined characteristic diagram value again, for example, as a result of refilling with fuel of a better quality, the adaptation values which are entered for each operating point should also be re-adapted and brought into line again. This may be achieved by resetting the adaptation value at a certain operating point in incremental steps of a certain return magnitude in the direction of the original predetermined characteristic diagram value when no or only a few knocking events are detected.

According to the invention, a change-over from a large regulating action to a smaller regulating action having smaller retard correction values will occur if there exists a learned long-time adaptation value for the respective operating point and where a knocking event has not been detected during a certain time period or during a corresponding number of ignitions. If there are considerable changes in the operating conditions, however, there will be a switch-over to the knock regulating algorithm having the large regulating action with the corresponding large retard correction values. This switch-over to the knock-regulating algorithm takes place when knocking events occur during the stepwise return through the advance correction values in the short-term control algorithm or while the correction is being performed. It may then be assumed that, by altering the operating parameters, there is a relatively high risk for knock to occur, thus necessitating a substantial regulating action. If the ignition correction is affected with a relatively small retard correction value, the ignition correction is performed via advance correction values which are smaller than when the ignition correction is performed via greater retard correction values. When a knocking event is identified, a counter may be set in a simple circuit in order to ascertain whether the knocking event occurs again during a switch-over condition until the correction has been completely worked through.

It is a further advantage of the invention to retain the current adaptation value even when the internal combustion engine or the vehicle is stopped, so that the adaptation magnitude is immediately available upon restarting the engine. As a result, the knock regulation operates immediately with the desired small regulation range.

DETAILED DESCRIPTION OF THE BEST MODE

Figure 3:
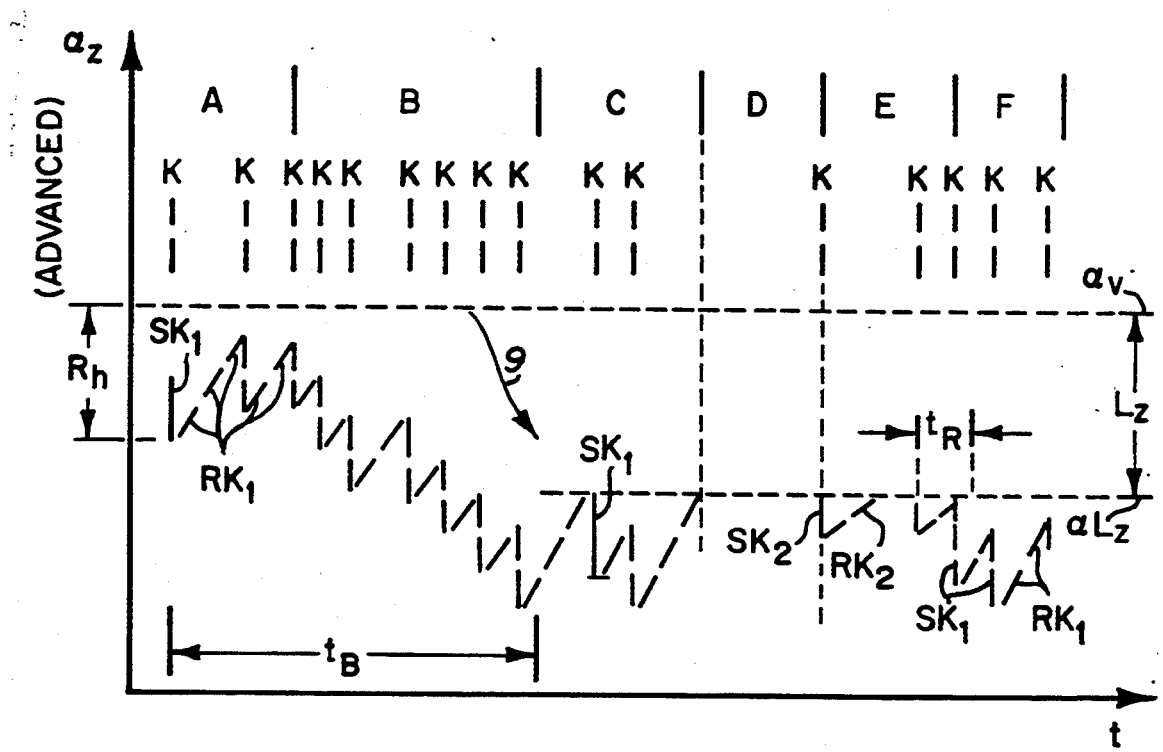

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Referring to FIG. 1, a conventional, known engine control system 20 of the type described above includes a basic set of performance characteristics assembled and stored in a memory unit 21, such as a read-only memory (ROM), which characteristics indicate ignition times of a particular engine type as a function of load and speed. This basic set of performance characteristics is typically determined on a test-stand, by reference to several examples of the engine, and serves as the starting point in controlling the engine in each vehicle having that corresponding type of engine. The speed $n_M$ and the load $M_d$ (torque) are now determined from suitable sensors (not shown) on the engine 26, and these characteristic operating parameters, which indicate a certain operating condition of the engine 26, are supplied to the central processing unit 24 where they are converted into memory addresses. On operating the engine 26 for the first time, the ignition time associated with a certain speed value and a certain load value is read out of the memory unit 21 on the basis of the address received from the central processing unit 24 and this value from the basic set of performance characteristics is transferred to the CPU 24 via the operating data control circuit (abbreviated CCT in FIG. 1) 23.

Referring to all three Figures at the same time, the engine 26 is monitored for detonating combustion (knocks), with the aid of a knock sensor (not shown). If a knock event is detected, a signal from the sensor will be fed to the operating data control circuit 23 when detonating combustion occurs, via knock-signal condition unit 27 and a knock regulator 28. When a knock event is detected at the motor 26, this knock signal K and the engine crankshaft-angle signal $\alpha_z$ will be supplied through the knock signal conditioning circuit 27, which is basically a pulse shaper, to a multiplexer in the knock regulator 28. If a knock signal of this kind is received in association with a certain speed value and a certain load value, a correction value (adaptation value) will be determined in the operating data control circuit 23 based on the value in the basic set of performance characteristics (predetermined characteristic diagram value in ROM 21). This correction value SK (see FIG. 3), will adjust the timing signal $d_z$ beneath the knock limit by an amount $R_h$ for this characteristic operating parameter. This correction value is now stored in the correction data memory 22 and becomes the original retard correction value $SK_1$.

If no knock signal results when a characteristic operating parameter (a certain speed and a certain load) occurs for the first time, the central processing until will shift the ignition time $\alpha_z$ towards the knock limit for this operating parameter, this being done in a stepwise manner, $RK_1$, whenever this characteristic operating parameter occurs until a knock signal is detected for the first time. The ignition-time value associated with this knock signal is then retarded by a predetermined correction value amount so that the ignition timing angle $\alpha_z$ lies slightly beneath the knock limit, and a corresponding characteristic diagram value $\alpha_v$ is stored in the set of data in memory unit 22.

The ignition-time values, derived initially from the basic set of performance characteristics and then adjusted on the basis of this set of correction data, are subjected to a final correction by the central processing unit 24, with respect to various further influence-parameters. These influence-parameters can be the air temperature $T_L$, the engine temperature $T_M$, the atmospheric humidity $\phi_L$, and the fuel/air ratio $\lambda$, and the fuel type since these parameters likewise influence fuel consumption-optimized operation. This forms the map of predetermined characteristic diagram values, $\alpha_v$. After applying the final correction, the ignition advance-and-retard device 25 is activated by control from the central processing unit 24, which then ensures that the engine 26 operates with optimum ignition times.

The operation of the system of FIG. 1 will be described in conjunction with FIGS. 2 and 3, which illustrate in greater detail the characteristic diagram values and the retards applied to engine 26 via control circuit 23. The engine speed $n_M$ and load (engine torque) $M_d$ are supplied from the engine 26 to the central processing unit 24 as shown. The central processing unit 24 determines from these parameters the address of the storage locations in the memory units 21 and 22 which correspond to this characteristic diagram value. This address is simultaneously applied to the memories 21 and 22 to read out the respective ignition-time value and retard value $SK_1$ stored at these memory locations. The central processing unit 24 therefore applies a final ignition-time signal to the ignition advance and retard device 25 for control of the motor operation. Thus, the system is capable of automatically correcting the ignition-time values stored in the memory unit 21 on the basis of the correction values stored in memory unit 22, these correction values being constantly changed and updated as described in more detail below with respect to FIGS. 2 and 3 as knock signals are generated during operation of the engine. In addition, the central processing unit 24 is capable of periodically adjusting the correction values in the memory unit 22 for those characteristic operating parameters which are below the knock level to ensure that an optimum control of the ignition timing at a level just below the knock level is maintained at all times.

FIG. 2 illustrates the dependency of the torque $M_d$ on the ignition timing $\alpha_z$ for three engine load conditions indicated as load curves 1, 4 and 6. The curve 1 represents a low engine load condition and is relatively flat. The knock limit is indicated at 2 and lies a long way from the maximum or peak 3 of the curve 1. For optimum performance, the internal combustion engine is preferably operated at the peak of its load curve or in this case at maximum or point 3. Thus, for a low-load curve such as curve 1, there is no danger that knocking combustions will occur.

The curve 4 represents a half-load range and is curved to a greater extent. In this case, the knock limit indicated at 2 has moved closer to the maximum or peak point 5, i.e., the point of optimum operation of the internal combustion engine. However, given an appropriate control, there is also no risk of any knocking combustions here either.

The curve 6 represents the full-load range (full-open throttle condition) where the knock limit 2 lies to the left or before the peak 11. The risk of knock occurring is greatest in the area between the curves 4 and 6 during optimized operation. This corresponds to the area where knock control is active. For the full-load range of curve 6, the optimum operating point is at 7, which in this case, lies just before the knock limit 2. The double arrow 8 indicates the seeking movement of the predetermined ignition point value towards this point 7 by means of the short-term control.

FIG. 3 is a diagram which shows a plot of the value of the ignition angle $\alpha_z$ (vertical axis) versus time (horizontal axis). The upper abscissa corresponds to a predetermined characteristic diagram value $\alpha_v$ for the ignition angle point from an entered characteristic diagram at a certain operating point. This predetermined characteristic diagram value $\alpha_v$ is preferably selected so that the internal combustion engine is operated close to the knock limit under normal operating conditions. In this case knocking events may occur. This state is illustrated as time period a in FIG. 3.

In accordance with known short-term regulation techniques, the predetermined characteristic diagram value $\alpha_v$ is modified or reset in stepwise fashion by a first large correction value $SK_1$ in the "retard" direction (often referred to as a regulation or control stroke) for an actual ignition point when knocking events, k, occur. When knocking stops, the value for the actual ignition point is advanced by stepwise advanced correction value $RK_1$, upon each ignition until it reaches the predetermined characteristic diagram value $\alpha_v$.

Time period b represents a situation where the operating parameters undergo change of the operating condition, such as, for example after refuelling, where a lower quality fuel is permitted to mix with a fuel of a higher quality. In period b, an increased number of knocking events k will occur one after the other. In practice, for this situation, the actual ignition points are moved one after another further away from the original predetermined characteristic diagram value $\alpha L_z$, at a (vertical) distance $L_z$ from the predetermined characteristic diagram value $\alpha_v$. This is indicated diagrammatically by the arrow 9. The new level $\alpha L_z$ corresponds to a changed knock limit. The value $L_z$ corresponds to a value (reduced by a predetermined small threshold) which is determined by averaging the previous control strokes $R_h$ in an observation period $t_B$.

Upon leaving the operating point for which the track of the ignition point is illustrated in FIG. 3, the value $L_z$ is stored in the knock control system memory (not shown) as an adaptation value and is immediately output again each time the operating point is reached, so that the control immediately continues without any transient processes for this operating point.

The track of the short-term control with a relatively large regulating action through relatively large retard correction values $SK_1$ and advance correction values $RK_1$ is illustrated in the time periods a, b, c. In periods a, b, and c, the large retard correction values $SK_1$ are indicated by the vertical displacements while the smaller advance correction values $RK_1$ are indicated by the upward inclined displacements. The long-term adaptation has already been assumed and becomes active in the period c. The adaption value $L_z$, is determined by averaging the previous control in the observation period $t_B$. The short-term control is therefore no longer related to the predetermined characteristic diagram value $\alpha_v$, but rather to the newly determined level $\alpha L_z$, which has been reduced by the adaptation value $L_z$, so that there is now also a re-control to this long-term level $\alpha L_z$. The long-term level $\alpha L_z$ is only altered relatively slowly.

The adaptation value $L_z$ for the short-term control has therefore already been assumed in the time period c and no more knocking events have been ascertained in the subsequent time period d (a certain minimum number of ignitions, preferably 500 being required for the time period d). When these conditions occur there is a switch-over to a smaller regulating action having correspondingly smaller retard correction values $SK_2$ and smaller return values as advance values $RK_2$.

This case is illustrated for the detonation K occurring at the beginning of time period e where the ignition angle is reset in the retard direction by the reduced magnitude retard value $SK_2$ and return by reduced magnitude advance correction value $RK_2$. If no further knocking events occur during the return (advance), the short-term control remains switched to the smaller magnitude correction values. However, should a subsequent knocking event K occur during a monitored return interval (in the present case indicated as time period $t_R$ at the end of the period e), there will be a switch-over to the values $SK_1$ and $RK_1$, for the greater regulating action, as illustrated in the period f.

A graduated regulating action is thus carried out which on average results in more advanced ignition points and thus the efficiency of the internal combustion engine operation is improved.

It should be understood that various modifications within the scope of this invention can be made by one of ordinary skill in art without departing from the spirit thereof. We therefore wish our invention to be defined by the scope of the appended claims as broadly as the prior art will permit, and in view of the specification if need be.

We claim:

1. A knock control system apparatus for a spark ignition internal combustion engine operable under a plurality of operating conditions comprising:
   a) first knock sensor means for producing signals indicative of the occurrence of a knock, K, mounted in association with at least one cylinder of the engine, said knock signal being provided to a microprocessor;
   b) second sensor means for producing input signals indicative of an ignition angle, $\alpha_z$, of said cylinder of the engine, said ignition angle input signal being provided to said microprocessor;
   c) means for advancing or retarding an ignition angle signal which produces a signal representative of an advance or retard of said ignition angle, $\alpha_z$;
   d) means for producing an ignition in said cylinder in response to said advance/retard ignition angle signal produced by said advance/retard signal producing means;
   e) a microprocessor, having at least one memory means for storing and outputting a signal corresponding to a predetermined characteristic diagram reference level value, $\alpha_v$, from a base diagram stored in memory, said diagram having a plurality of characteristic performance values, which characteristic diagram reference level value, $\alpha_v$, corresponds to a first reference level for an ignition point of the engine at a first operating condition having a first knock limit;
   f) said means for advancing or retarding said ignition controlling a knock, K, on a short-term basis during said first operating condition in response to a signal from said microprocessor corresponding to said predetermined characteristic diagram reference level value $\alpha_v$, of said first reference level for the ignition point at said first operating condition, by resetting, in response to said knock signal provided to said microprocessor when said knock, K, occurs, said ignition angle $\alpha_z$ in a retard direction stepwise by at least one first retard correction value $SK_1$, and ,during subsequent absence of signals indicative of said knock, K, said ignition angle $\alpha_z$ is reset in an advance direction stepwise by a first advance correction value $RK_1$ toward said predetermined characteristic diagram reference level value $\alpha_v$; and
   g) said microprocessor adaptively controls said knock, K, on a long term basis during transitions between said first operating condition having said first knock limit and a second operating condition having a second knock limit:
   i) in response to said knock sensor sensing at least one knock, by resetting said predetermined characteristic diagram reference level value $\alpha_v$ by an adaptation value $L_z$ in a direction below said first knock limit, to a second predetermined characteristic diagram reference level value $\alpha_{LZ}$ such that said short-term knock control steps $SK_1$ are thereafter referred to said second predetermined characteristic reference level diagram value $\alpha_{LZ}$ as a new reference level corresponding to an ignition point at said second operating condition, to provide corresponding signals to said means for advancing or retarding said ignition angle signal; and ii) in response to subsequent absence of signals indicative of said knock sensor sensing a subsequent minimum number of knockless ignitions, by resetting said short-term knock control with a second retard correction value $SK_2$ and a second advance correction value $RK_2$, said second retard and said second advance corrections values $SK_2$, $RK_2$ having smaller magnitudes of correction than said first retard and said first advance correction values, $SK_1$, $RK_1$, respectively, to provide corresponding signals to said means for advancing or retarding said ignition angle signal resulting in more efficient engine combustion.

2. A knock control system as in claim 26 which includes:
a) means for counting one or more knock signals K in a first repetitive monitoring time interval $t^1_B$; and
b) said means for advancing or retarding said ignition angle signal resetting said predetermined characteristic diagram value $\alpha_v$ by said adaption value $L_z$ in response to a signal from said counter representing a predetermined number of knock signals counted in said interval.

3. A knock control system as in claim 2 wherein:
a) said memory includes a correction characteristic diagram stored therein;
b) said adaption value $L_z$ is entered in said correction characteristic diagram in said memory upon said engine leaving said second operating condition;
c) said value $L_z$ is withdrawn from said memory as a learned correction magnitude value; and
d) said predetermined characteristic diagram reference level value $\alpha_v$ is adapted by the amount of $L_z$ as said second predetermined characteristic diagram reference level value $\alpha_{LZ}$ when said second operating condition is reached again by said engine.

4. A knock control system as in claim 3 wherein:
a) said adaption value $L_z$ is reset in steps by a predetermined return magnitude value in the direction of said predetermined characteristic diagram reference level value $\alpha_v$ in response to said counter means signaling that a minimum threshold number of knocks K has not been exceeded during said monitoring time interval $t^1_B$.

5. A knock control system as in claim 4 wherein:
a) said short-term knock control with said second retard and said second advance correction values $SK_2$, $RK_2$ includes switching back to said short-term knock control with said first retard and first advance correction values $SK_1$, $RK_1$ in response to said counter means signaling at least one instance of knock K occurring within a second monitoring interval $t^2_B$ during a return through said second said second retard and said second advance correction values $SK_2$, $RK_2$.

6. A knock control system as in claim 5 wherein:
a) said short-term knock control switch-back to said first retard and first advance correction values $SK_1$, $RK_1$ is maintained in response to said counter signaling the occurrence of repeated instances of knock K until correction has been worked through.

7. A knock control system as in claim 5 wherein:

a) one of said first retard correction values $SK_1$ associated with said first operating condition is selected as said adaption value $L_z$.

8. A knock control system as in claim 5 wherein:
a) said adaption value $L_z$ is an average of each of said first retard correction values $SK_1$ in said first monitoring time interval $t^1_B$.

9. A knock control system as in claim 5 wherein:
a) said adaption value $L_z$ is an average of each of said first retard and said first advance correction values $SK_1$, $RK_1$ in said first monitoring time interval $t^1_B$.

10. A knock control system as in claim 5 wherein:
a) said adaption value $L_z$ is retained in said memory even when the internal combustion engine is stopped, and is immediately available as an adaption magnitude upon restarting said engine.

11. A knock control system method as in claim 6 wherein:
a) said adaption value $L_z$ is retained in said memory even when the internal combustion engine is stopped, and is immediately available as an adaption magnitude upon restarting said engine.

12. A knock control system as in claim 7 wherein;
a) said adaption value $L_z$ is retained in said memory even when the internal combustion engine is stopped, and is immediately available as an adaption magnitude upon restarting said engine.

13. An internal combustion engine control system for suppression of knock events, K, in an internal combustion engine, which system includes a memory containing data representing ignition advance and retard values generated by method of:
a) providing to said memory a predetermined characteristic diagram reference level value, $\alpha_v$, from a base diagram having a plurality of characteristic performance values, which characteristic diagram value, $\alpha_v$, corresponds to a first reference level for an ignition point of the engine at a first operating condition having a first knock limit;
b) producing signals indicative of the occurrence of a knock, K, in at least one cylinder of the engine;
c) producing signals indicative of an ignition angle, $\alpha_z$, of said cylinder of the engine;
d) producing a signal representative of an advance or retard of said ignition angle, $\alpha_z$;
e) advancing or retarding said ignition signal on a short-term basis during said first operating condition upon comparison with a predetermined characteristic diagram value $\alpha_v$ corresponding to a first reference level for the ignition point at said first operating condition retrieved from said base diagram of a plurality of characteristic performance values stored in said memory, so that when said knock K occurs, said ignition angle $\alpha_z$ is reset in a retard direction stepwise by at least one first retard correction value $SK_1$, and during subsequent absence of said knock K, said ignition angle $\alpha_z$ is reset in an advance direction stepwise by a first advance correction value $RK_1$ toward said predetermined characteristic diagram reference level value $\alpha_v$;
f) adaptively controlling said knock, K, on a long term basis during transitions between said first operating condition having said first knock limit and a second operating condition having a second knock limit, by:
i) resetting said predetermined characteristic diagram value $\alpha_v$ in response to a knock sensor sensing at least one knock by an adaptation value $L_z$ in a direction below said first knock limit, to a second predetermined characteristic diagram value $\alpha_{LZ}$, such that said short-term knock control steps $SK_1$ are thereafter referred to said second predetermined characteristic diagram value $\alpha_{LZ}$ as a new reference level corresponding to an ignition point at said second operating condition; and ii) resetting said short-term knock control in response to a knock sensor sensing a subsequent minimum number of knockless ignitions, with a second retard correction value $SK_2$ and a second advance correction value $RK_2$, said second retard and said second advance correction values $SK_2$, $RK_2$ having smaller magnitudes of correction than said first retard and said first advance correction values, $SK_1$, $RK_1$, respectively.

14. An internal combustion engine control system as in claim 13 wherein said memory includes data representing engine knock control parameters generated by the steps of:

a) determining a first monitoring time internal $t^1_B$;

b) selecting a minimum threshold number of knocks, K, to occur within said first monitoring time interval $t^1_b$;

c) determining a second monitoring time interval $t^2_B$; and d) selecting a number of knocks, K, to occur within said second monitoring time interval $t^2_B$.

15. An internal combustion engine control system as in claim 14 wherein said memory data generating steps include accumulating repeated instances of knock, K.

16. An internal combustion engine control system as in claim 14 wherein said memory data generating steps include selecting one of said first retard correction values SK, is said adaption value $L_2$.

17. An internal combustion engine control system as in claim 14 wherein said memory data generating steps include determining said adaption value $L_z$ to be an average of each said first retard correction values $SK_1$ in said first monitoring time interval $t^1_B$.

18. An internal combustion engine control system as in claim 14 wherein said memory data generating steps include determining said adaption value $L_v$ to be an average of each of said first retard and said first advance correction values $SK_1$, $RK_1$ in said first monitoring time interval $t^1_B$.

* * * * *